J. C. Robie,
Railroad Turn Table,
No. 460, Reissued May 5, 1857.
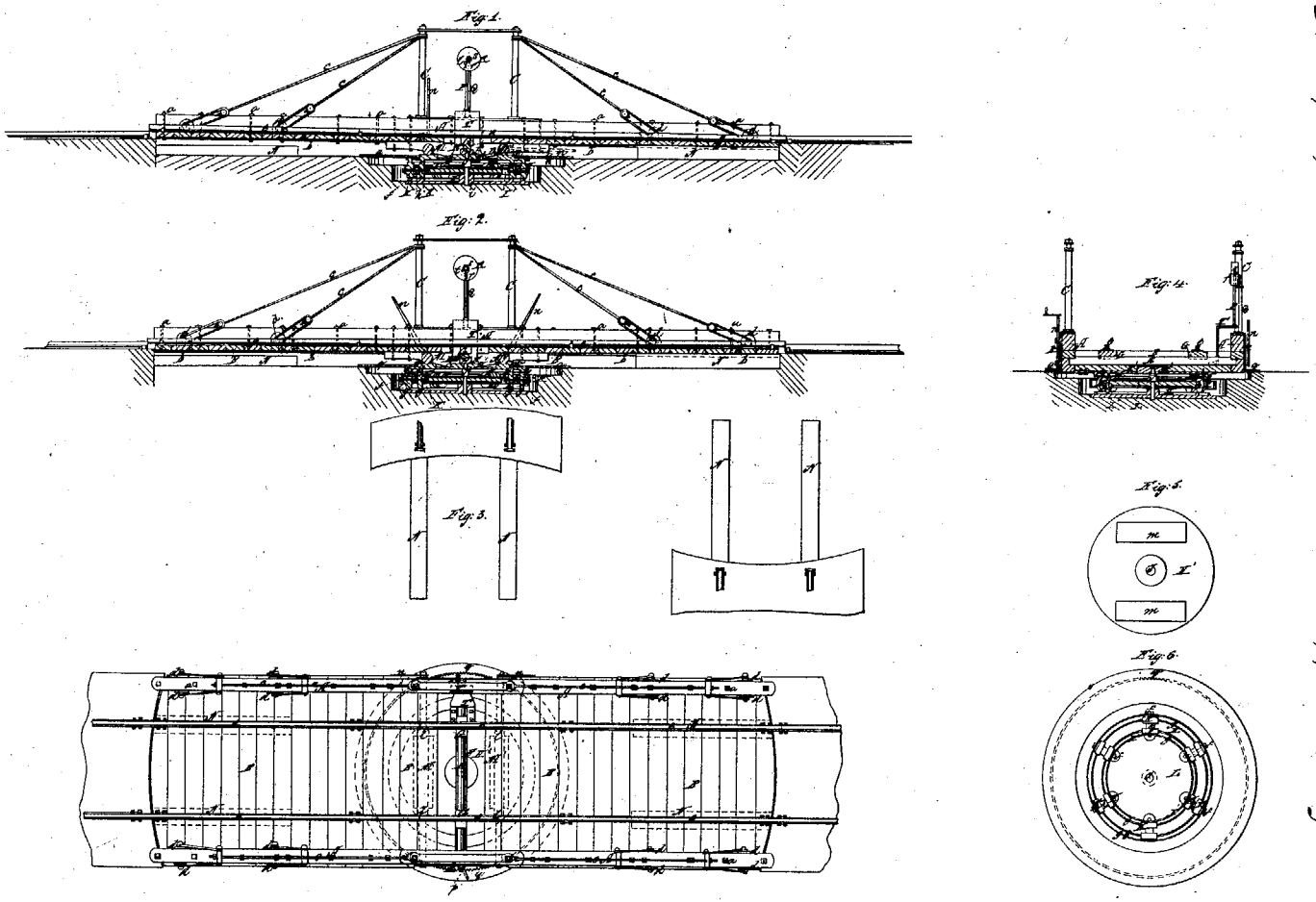
N. PETERS, PHOTO-LITHOGRAPHER, WASHINGTON, D. C.

UNITED STATES PATENT OFFICE.

JACOB C. ROBIE, OF BINGHAMTON, NEW YORK.

IMPROVEMENT IN TURN-TABLES.

Specification forming part of Letters Patent No. 11,532, dated August 15, 1854; Reissue No. 460, dated May 5, 1857.

*To all whom it may concern:*

Be it known that I, JACOB C. ROBIE, of Binghamton, in the county of Broome and State of New York, have invented a certain new and useful Improvement in Turn-Tables for Railroads, of which the following is a full, clear, and exact description, reference being had to the accompanying drawings, which form a part of this specification, and in which—

Figures 1 and 2 represent longitudinal vertical sections through the center of a turn-table constructed according to my improvement; Fig. 3, a plan of the same; Fig. 4, a transverse vertical section through, or nearly through the center; Fig. 5, a plan of the top roller-plate; Fig. 6, a plan of the bottom roller-plate with the rollers, the top roller-plate being removed.

My invention consists in balancing the platform of the turn-table upon a revolving roller-carriage, which supports it in such a manner that either end of the said platform may be depressed to rest upon a bed or bearings provided for it, while it receives or has discharged from it the engine and tender, or either, or other railroad-vehicle.

The platform of this turn-table may be constructed in a similar manner to that of some others now in use, and, as represented in the accompanying drawings, may be composed of longitudinal timbers A A and ties or sills B B, secured below them by bolts *a a* and plates *b b*, the sills forming the floor upon which the rails *e e* are laid. The platform may be stayed to prevent deflection by tension-rods *c c*, attached to ears *d d*, that project from the plates *b b* on either side of the longitudinal timbers, and which rods may be attached at their other ends to pillars C C, erected upon the longitudinal timbers A A, near their center; and the platform may be further strengthened at the center by short longitudinal timbers D D, bolted under the longer longitudinal timbers A A and sills B B. To illustrate my invention, this platform I balance by placing under the middle portion of it a horizontal shaft or bearing, or shafts or bearings—say, for example, a single transverse horizontal shaft, E, with its ends secured firmly in the longitudinal timbers which form the sides of the platform, and said single shaft crossing the platform at its center. This shaft E may be supported along the whole of its length between the sides of the platform, or at suitable intervals, in a bearing, F, running across the roller-carriage and supporting two bearings, G G, for the rails *e e*. The roller-carriage consists of bottom and top plates, H H′, a center-pin, J, two rings, I I′, and rollers K K, with their axles *f*. The bottom and top plates in a turn-table of large size—say from forty (40) to forty-five (45) feet in diameter—capable of carrying an engine and tender, need not be of more than eight (8) feet in diameter. The bottom plate, H, has two circular raised tracks *g g*, and is bored to receive the center-pin J. This bottom plate may rest upon a foundation of masonary about three (3) feet below the level of the rails *e e*. This foundation need be but very small compared with the foundation of the track usually provided for rollers near the ends or outside of the table. The rollers K K are fitted loosely upon their axles *f f*, with a collar, *h*, between each pair of rollers that turn upon the one axle, *f*, the several axles *f f* supporting two rings, I I′, which keep the rollers at proper distances from a common vertical axis for them to run on the tracks *g g*, and the several pairs of rollers at proper distances from each other. The inner ring, I′, is connected with a central plate, L, which is bored through the center for the center-pin J to pass through and keep the two rings concentric with the axis on which the table rotates; or, instead of having the central plate, the ring I′ may be connected by arms with a hub. The top plate, H′, may be of the same size as the bottom plate H and has two similar circular tracks, *g g*, on its under face, which rest upon the rollers K K. The center-pin J is firmly secured to the top plate, H′, and passes through the central plate, L, and bottom plate, H, the latter having a deep hub, *i*, in order to give the pin a deep guide. The plates H H′ are cast each in one piece of sufficient strength to sustain all necessary weight without material deflection, so that the whole pressure of the loaded table, resting upon its bearing or bearings on the upper roller-plate, will bear equally upon all the rollers. In constructing these plates H H′, they should be put into a lathe and the holes for the center guide-pin, J bored out and the tracks *g g* on the plates turned true with each other and rounded on their roller bearing edges. The rollers K K should be turned of an equal size with their peripheries cylindrical, and, as before observed, are arranged in pairs, which work on the same axle, but independent of each other, each pair of rollers occupying the same radial position.

At equal distances from and parallel with the cross-balancing shaft E, that has been described as running across the center of the roller-carriage, and in such case over the center guide-pin J, and connected with the roller-carriage by the bearings F fast to the top plate thereof, on opposite sides of said shaft E, are two shafts, M M′, whose ends have journals, which are fitted to work in bearings secured to metal plates *k k*, attached to the sides of the platform. The central portion of each of these shafts, for so much of their length as is included between *l l*, and shown in dotted lines in Fig. 3, is larger than the other portion and made eccentric to the journals, as shown in Figs. 1 and 2, where the section is taken through the eccentric portion, and the journals are shown by dotted circles.

Upon the top face of the upper roller-plate, H′, there are two raised pieces, *m m*, which form bearings for the eccentric portions of the shafts M M′ to rest upon. Each of the shafts M M′ is furnished, outside the platform, with a lever, *n*, by which it can be turned to bring that side of the eccentric portion which is farthest from its axis undermost, as shown by the position of the left-hand eccentric in Fig. 1, and thus, coming in contact with its bearing *m* on the top roller-plate, elevate that end of the platform which is on the same side of the shaft E; or it can be turned to such a position as shown by the eccentric on the right-hand side of Fig. 1 that it will not, when the end of the platform on the same side of the shaft E is depressed to its lowest position, touch the bearing on the roller-plate.

The depressed end of the platform rests upon bearing pieces N N, of which two may be provided to receive either end in all the positions the turn-table is required to assume. These bearings may consist of heavy timbers resting upon foundations of masonry, or may be constructed in any other suitable manner, and so placed as to support the platform under the rails. The object of these is to obviate lateral strain upon the rollers or center-pin when the platform receives its load. The drawings represent, in Fig. 3, two sets of these bearings, one set being shown in perfect outline, and the other set in dotted outline, supposed to be seen through the platform, the two sets being arranged to bring the turn-table in line with rail-tracks at right angles with each other, and either set serving for two positions of the turn-table, the reverse of each other.

The turn-table may be caused to rotate in a well-known way by means of a pinion which is secured on a vertical shaft, *p*, attached to the platform, said pinion gearing with a circular toothed rack, *q*, secured to the foundation work. An indicator, to show when the platform is in equipoise or on a level, may be used. This indicator is represented as consisting of an index-pointer, *r*, whose horizontal arbor works in suitable bearings in a box, R, which is supported by a pillar, Q, standing on one side of the platform. The axis of this arbor stands in an imaginary line which is perpendicular to the platform and passes through the axis of the shaft E. This arbor carries a small toothed wheel, *s*, which gears with a toothed sector, *t*, on the top of a pillar, P, that is erected on a standard, T, secured to the top roller-plate, H′. The toothed sector is described from the axis of the shaft E, so that as the platform oscillates it always remains in gear with the wheel and turns the arbor and moves the index. The index is so adjusted that when the platform is on a level it stands in a vertical position, but when the platform is not on a level it will point toward the highest end, and thus show the way in which it is necessary to move the engine or carriage in order to bring the platform to a state of equipoise, in which position its rails stand slightly higher than the rails of the road proper, as represented in Fig. 2.

When an engine or car is to be run on the turn-table, the shaft, M or M′, which is nearest the end where the engine or car is to be run on is turned by its lever to such a position that its eccentric part cannot touch its bearing *m* on the top roller-plate, the other shaft M or M′ is turned to bring its eccentric part in contact with its bearing *m* and raise the other end of the table until the first-named end is depressed far enough to rest on the bearing-pieces N N, and in this position (indicated in Fig. 1) it is allowed to remain until the engine or car is run on the table, when said eccentric or shaft is moved to a position corresponding to the other eccentric or shaft that was moved out of lifting, or, rather, tilting action on the table, to allow the platform to be balanced. When the engine or car is brought to the proper position to bring the platform to a state of equipoise, the two shafts M M′ are moved to the position shown in Fig. 2, to bring their eccentric portions into contact with the bearings *m* on the top of the roller-plate, and thus give support to the platform on opposite sides of the shaft E. The turn-table may then be turned in any direction.

When it is desired to run off the engine or car, the support of the eccentric on that side of the shaft E from which it is to be run off is removed by turning the shaft M or M′ to such a position that the eccentric cannot touch its bearing *m*, which leaves that end of the platform free to fall when the load is moved toward it.

The rails *e* of the turn-table and the rails of the track are so arranged relatively to each other that the depressed ends of the former are always at the same level, or thereabouts, as the latter, when the depressed side of the table rests on the bearing-pieces N N. The distance of the oscillation of the platform is somewhat exaggerated in Figs. 1 and 2, in order to make the operation more clearly intelligible by the drawings, it only being necessary that the ends of the table rise far enough from the bearing-pieces N N to enable the table to swing perfectly free over them without danger of impeding and destructive contact.

What I claim as new and useful, and desire to secure by Letters Patent, is—

Balancing the platform of the turn-table upon a transverse shaft or other suitable bearing or bearings resting upon or connected with the carriage which supports said platform in such a manner that the table, when in a horizontal position, or thereabout, is elevated above its under supports or end bearings to admit of its free swing, and so that the table may be depressed at either end to bring the ends of its rails on either side of the carriage into line or level with the rails of the track, for the purposes set forth.

In testimony whereof I have hereunto subscribed my name.

JACOB C. ROBIE.

Witnesses:
H. E. PRATT,
N. B. BOOTH.